United States Patent Office 3,366,508
Patented Jan. 30, 1968

3,366,508
PROCESS FOR BONDING ETHYLENE COPOLYMERS TO POLYAMIDE AND CELLULOSIC SUBSTRATES
George Arthur Gallagher, Media, Pa., assignor to E. I. du Pont de Nemours and Company, Wilmington, Del., a corporation of Delaware
No Drawing. Filed Apr. 13, 1964, Ser. No. 359,476
1 Claim. (Cl. 117—138.8)

ABSTRACT OF THE DISCLOSURE

Bonding of ethylene, propylene, non-conjugated diene terpolymers to polyamides or cellulosics by (I) coating the latter with an aqueous dispersion of (a) a sulfur-curable ethylene copolymer substituted by halogen-containing lower-alkyl side chains, and (b) a resorcinol-formaldehyde type resin, (II) drying the coating, and (III) curing the terpolymer while pressing it in contact with the coated substrate.

---

This invention relates to a new adhesive composition and its use for bonding α-olefin hydrocarbon polymers to selected materials.

Sulfur-curable, chain-saturated α-olefin hydrocarbon polymers (for example, copolymers of ethylene, propylene and non-conjugated dienes) are acquiring increasing importance today in the manufacture of a wide variety of useful products. Applications such as tires, industrial belts, tarpaulins and the like require that the polymers be bonded to substrate materials such as nylon and rayon.

The adhesives currently available for bonding these polymers to substrates of this type have not been entirely satisfactory. For example, the customary tire cord dips have provided inadequate bonding. Better results have been obtained by applying an organic solvent solution of selected adhesives over the coated cords, but this procedure is economically undesirable for several reasons. Application of the second coat entails additional labor charges and storage costs. Furthermore, the handling and recovery of the volatile organic solvents used in the coating require extra plant investment and still more operating expense. For reasons of both operating safety and economy, many plants are only equipped at present to use aqueous dispersions.

It has unexpectedly been found that a sulfur-curable, chain-saturated α-olefin hydrocarbon copolymer can be firmly adhered to a polyamide or cellulosic substrate by a one-step coating of the substrate with an aqueous dispersion containing (a) sulfur-curable, chain-saturated, side-chain halogen-substituted ethylene copolymer having an inherent viscosity of at least about 0.3 and (b) a resorcinol-formaldehyde type resin, drying the coating material, and curing the hydrocarbon copolymer while pressing it in contact with the coated substrate.

The substrates being bonded to the α-olefin hydrocarbon polymers includes the normally solid polyamide and cellullosic substrates. In a particularly valuable application of the present invention these materials are in the form of woven fabrics, tire cords, filaments, spun fibers or blends thereof. Representative examples are the industrial fibers such as nylon, cotton, and rayon.

The sulfur-curable, chain-saturated α-olefin hydrocarbon copolymer is generally a copolymer of at least one α-monoolefin having the structure R—CH=CH$_2$ wherein R is hydrogen or alkyl of 1 to 16 carbon atoms (e.g., ethylene, propylene, 1-hexene), with at least one non-conjugated hydrocarbon diene (e.g., 1,4-hexadiene). The most preferred class of copolymers include those containing about 20 to 75 weight percent ethylene monomers units. Representative copolymers includes ethylene/propylene/1,4-hexadiene; ethylene/1,4-hexadiene; ethylene/propylene/dicyclopentadiene; ethylene/propylene/5-methylene-2 - norbornene; and ethylene/propylene/1,5-cyclooctadiene. Other suitable monomers, copolymers and preparations are disclosed in U.S. Patents 2,933,480; 3,000,-866; 3,063,973, 3,093,620; 3,093,621; and French Patent 1,321,029.

One of the important components of the adhesive composition is an aqueous latex of a side-chain halogenated olefin polymer. These polymers and their preparation are set forth in French Patent 1,339,010. Their inherent viscosity (measured on a solution at 30° C. containing 0.1 gram of polymer in 100 cc. of tetrachloroethylene) is at least about 0.3 and they have a halogen content of at least about 1% by weight. In the preferred polymers the halogen atoms are bromine or chlorine, or combinations thereof; the halogen content is greater than 10 but less than about 40 weight percent. The polymer should have an iodine number of at least 2; in typical preferred polymers the value is about 10–15.

The term "polymer backbone" is sometimes employed to describe the term "chain" employed here. Most often these polymers contains structural units derived by incorporation of monomers having a terminal carbon-carbon double bond (e.g., ethylene, 5,6-dibromo-1-hexene). Thus, these polymers are substituted polymethylenes, particularly upon substitution by halogenated alkyl radicals of from 2 to 4 carbon atoms containing from 1 to 2 halogen atoms.

The most preferred adhesive copolymers are those having monomer units of ethylene/1,4-hexadiene/5,6-dibromo-1-hexene (e.g., having the units in a parts by weight ratio of 48:4:48; an iodine number of 12 and an inherent viscosity of at least 0.5) and ethylene/1,4-hexadiene/4,5-dibromo-1-hexene (containing 35 weight percent bromine and an iodine number of 10). Another preferred copolymer is one having units of ethylene/1,4-hexadiene/4,5-dichloro-1-hexene exhibiting an iodine number of about 10 and containing about 21 weight percent chlorine. The halogen-bearing polymeric adhesive can be prepared also by halogenating copolymers of α-monoolefins and non-conjugated dienes. Thus, preferred adhesives are made by brominating an ethylene/1,4-hexadiene copolymer which has an inherent viscosity of about 1 and an iodine number of about 90 to give a product exhibiting an iodine number of 10 and containing 35 weight percent bromine; another preferred copolymer is prepared by chlorinating an ethylene/1,4-hexadiene copolymer to give a product having an iodine number of about 10 and containing about 21 weight percent chlorine. The copolymers being halogenated are preferably made from ethylene.

The total concentration of solids in the latexes typically ranges from 10 to 30 weight percent. The value is not critical and is selected to give a latex convenient for use in the final dip. When the concentration is below 10 weight percent, the amount of coating deposited on the fabric or cord after a single dip may be lower than desired.

Suitable latexes are prepared from organic solutions of side-chain halogenated polymer in a conventional manner: typically, the polymer solution is mixed with water containing a surface-active agent; removal of the organic solvent from the resulting emulsion gives the latex. Representative solvents include aliphatic and aromatic hydrocarbons (e.g., hexane, cyclohexane, benzene, toluene) and halogenated aliphatic and aromatic hydrocarbons (e.g., carbon tetrachloride, 1,1,1-trichloroethane, and tetrachloroethylene). Water soluble organic emulsifying agents, or mixtures thereof, which will give oil-in-water emulsions are used. The term "oil-in-water" emulsifying agents is well understood by those skilled in the art and is set out in detail in the book "Surface Active Agents," Swartz and Perry, Interscience Publishers, Inc. (1949), pages 9–12, 54, 116–120. Typical anionic emulsifying agents are the sodium salts of long-chain alkyl-substituted aryl sulfonic acids or long-chain alkyl sulfonic acids or long-chain alkyl hydrogen sulfates. Representative non-ionic agents include mono- (and di-) long-chain alkyl ethers of polyethylene ether glycol. A particularly preferred procedure involves the use of a minor proportion of an emulsification modifier, soluble in both the aqueous and the oil phase. A preferred example is isopropanol; alternatives include methanol, ethanol and acetone. The modifier is introduced prior to the formation of the latex; it is preferably added to the aqueous phase but may be in either or both. Those skilled in the art can determine the optimum amount to employ for a particular system. If too little modifier is employed, the resultant latex may not have as fine a particular size as desired. Excessive proportions of modifier may lead to coagulum formation or separation of the organic solvent. A typical concentration in water is 30 volume percent.

The phenol-aldehyde type resin solution which is the other important component of the adhesive composition, is preferably made by reacting formaldehyde (or materials furnishing formaldehyde such as paraformaldehyde), with a phenolic component, e.g., a dihydroxybenzene such as resorcinol, which is preferred. Such resins can be made by procedures familiar to those skilled in the art. The relative proportion of aldehyde to phenolic component can be varied. In representative procedures about 0.7 to 2 moles of formaldehyde have been supplied for each mole of resorcinol. Generally, the condensation is carried out under basic conditions, e.g., at a pH in the range 8–9 in the presence of a strong basic material such as an alkali metal hydroxide. However, resins made under slightly acidic conditions, e.g., pH 3–4, are also suitable. If the resin solution is made at a pH below 7, it is preferably made alkaline (e.g., with NaOH or ZnO) before use. The mixture of resorcinol, formaldehyde, and catalyst is usually allowed to react at a temperature of about 25° C., but higher temperatures may be employed to hasten the reaction if desired. The time needed to carry out the condensation can be determined by routine experimentation.

An alternative procedure involves the in situ preparation of the resorcinol/aldehyde condensate in the presence of the halogenated polymer latex. For example, the formaldehyde, resorcinol and optionally a basic oxide (e.g., zinc oxide) can be mixed with the latex and the composition subsequently allowed to stand at room temperature until ready for use. Empirical routine testing can be used to find out the amount of time needed to age the composition to get optimum results. Five to 6 hours is representative.

The relative proportions of the halogenated polymer and the formaldehyde/resorcinol resin in the adhesive can be varied quite widely to suit the needs of the particular application. In representative adhesive compositions about one to six proportions of halogenated ethylene/1,4-hexadiene copolymer have been employed for every proportion by weight of the phenol-aldehyde type resin.

In the first step of the process of the present invention the substrate (e.g., the fabric) is coated with the aqueous adhesive composition. This composition may be applied in any manner desired, such as by dipping, painting, or by roller coating. The coating is then dried at an elevated temperature such as 135° C. The amount of adhesive applied is not particularly critical; representative amounts range from about 5 to 15 percent by weight of the fabric. Generally speaking, 5–7% is sufficient to give strong bonds. Less may be applied, but the adhesion will tend to decline. Addition of higher amounts is wasteful and may, if carried too far, cause the adhesion to be less than the optimum desired.

The α-olefin hydrocarbon copolymers are compounded with suitable curing agents before being bonded to the coated substrate. Typical curing aids are sulfur, zinc oxide, and curing accelerators. Those skilled in the art can select by routine empirical experiments the best combinations of accelerators when curing a particular assembly. In addition to the above-described components, the α-olefin copolymer may include such optional components as carbon black and conventional antioxidants. It is to be understood that various modifications of the sulfur curing procedures may be employed depending upon the stock. Various procedures and modifications of sulfur curing are more particularly described in Encyclopedia of Chemical Technology, Kirk and Othmer, published by Interscience Encyclopedia, Inc., New York, 1953, vol. 11, pages 892–927; Principles of High-Polymer Theory and Practice, Schmidt and Marlies, published by McGraw-Hill Book Co., New York, 1948, pages 556–566; Chemistry and Technology of Rubber, edited by M. Morton, Reinhold Publishing Corp., New York, 1959, pages 93–129; The Applied Science of Rubber, edited by W. J. S. Naunton, Edward Arnold Ltd., London, 1961, pages 346–413, 992–1099.

The adhered composite article is finally obtained by heating the curable assembly under pressure. Temperatures generally range between about 130–160° C. with about 150° C. and 160° C. being preferred. Cure times are not critical and can range from between about 10 minutes and 2 hours without adverse effect on the adhesion obtained. The cure time will vary inversely with the temperature, higher temperatures requiring shorter cure times. Those skilled in the art will select the particular conditions needed for optimum results based on such considerations as the conditions recommended in the art for the particular curing agents being used, etc. During the cure, pressure may be applied as desired.

The invention wil now be described with reference to the following examples of specific embodiments thereof wherein parts and percentages are by weight unless otherwise specified.

EXAMPLE 1

(A) *Preparation of ethylene/5,6-dibromo-1-hexene/1,4-hexadiene copolymer.*—A copolymer of ethylene/5,6-dibromo-1-hexene/1,4-hexadiene is prepared in a thoroughly dried 1-liter resin kettle fitted with an agitator, gas inlet tube, thermometer and exit tube. In it are placed 845 cc. of methylene chloride which has been dried over silica gel overnight with a slow nitrogen sparge. Agitation is begun and after the methylene chloride has been cooled to −5 to −10° C., 10 cc. (194 g./0.80 gram-mol) of 5,6-dibromo-1-hexene and 11.7 cc. (8.2 g./0.10 gram-mol) of 1,4-hexadiene are added. Both of the latter are purified by passing them through a neutral aluminum oxide column immediately before use. A mixed stream of ethylene and nitrogen is then introduced supplying the gases at the respective rates of 0.40 liter per minute and 1.2 liters per minute. After 20 minutes, 1.35 g. of freshly recrystallized vanadium oxy bis (acetylacetonate) and 8.7 cc. of diisobutyl-aluminum chloride are added to start the polymerization.

The gas addition is continued 2⅔ hours and during this time a noticeable increase in viscosity of the solution occurs. The temperature is kept at about −10° C.

After 2⅔ hours, the gas flow is stopped and 10 cc. of anhydrous ethyl alcohol are added to the polymerization mixture to deactive the catalyst. The mixture is then poured into 1 liter of acetone, thereby precipitating the copolymer. After the acetone has been removed by filtration, the copolymer product is washed twice with approximately 500 cc. of anhydrous ethyl alcohol and then washed once more with approximately 500 cc. of acetone. The acetone is then removed and the copolymer allowed to dry overnight. About 104 grams of the ethylene/5,6-dibromo-1-hexene/1,4-hexadiene copolymer is obtained. It typically displays the following properties: percent Br, 34; iodine number, 11; inherent viscosity, 0.55 (0.1 gram copolymer in 100 ml. tetrachloroethylene at 30° C.).

(B) *Preparation of polymer latex.*—Twenty grams of the above copolymer are dissolved in 488 ccs. of carbon tetrachloride by heating at reflux with agitation at atmospheric pressure. The solution is poured into an Eppenbach homomixer and agitated vigorously, while a solution of 0.80 g. of "Alrosal" and 0.80 g. of "Benax" 2A1 surfactants in 122 ccs. of water are added. The agitation is continued for 3–4 minutes during which time the mixture thickens until it has the consistency of beaten egg white. The emulsion is then transferred to a 2-liter four-necked, round-bottom flask. The carbon tetrachloride is stripped off at about 50° C.; during this operation the pressure is reduced from atmospheric pressure down to about 40 mm. of mercury was quickly as possible without causing excess foaming. After about 2 hours, about 77 g. of milky latex are left in the pot.

(C) *Preparation of resorcinol/formaldehyde resin.*— A phenol-aldehyde type resin is prepared by stirring together 55.6 cc. of distilled water and 4.41 cc. of 7.85 weight percent aqueous NaOH solution in a 125-cc. Erlenmeyer flask at 25–30° C.; 2.76 g. of resorcinol are then added and mixed until dissolved. Then 3.80 cc. of 37% aqueous formaldehyde solution are added slowly with stirring. After being agitated for two minutes, the resin solution is aged for 48 hours at 25–30° C. before use. This resin solution contains about 6.4% solids, has a pH of 9.3 at 25° C. and a formaldehyde to resorcinol mole ratio of about 2.0 to 1.

(D) *Preparation of adhesive composition.*—Twenty-five grams of the above copolymer latex, are mixed at 25° C. with 10 grams of the resorcinol/formaldehyde resin solution. The resulting adhesive composition is ready for use.

(E) *α-Olefin hydrocarbon elastomer.*—The ethylene/propylene/1,4-hexadiene copolymer employed is made in accordance with the general directions of U.S. Patent 2,933,480 using a diisobutyl aluminum chloride/vanadium oxytrichloride catalyst and tetrachloroethylene solvent. Representative samples of this copolymer contain about 42–47% propylene monomer units and 3–4% 1,4-hexadiene monomer units by weight and exhibit Mooney (ML-4/100° C.) visocsity values of from about 80 to 90.

The elastomeric copolymer is compounded as follows on a rubber roll mill at about 25–40° C.:

| | Parts by weight |
|---|---|
| Ethylene/propylene/1,4-hexadiene copolymer | 100 |
| Carbon black, HAF | 50 |
| ZnO | 5 |
| Sulfur | 1 |
| 2-mercaptobenzothiazole | 0.5 |
| Tetramethyl thiuram monosulfide | 1.5 |

(F) *Adhesion of elastomer to nylon fabric.*—The filament nylon fabric used is a plain weave with a count of 60 x 40 (obtainable as Style SN-7 from Wellington Sears, 111 W. 40th St., New York 18, N.Y.). The spun fabric used has 48 warp ends and 36 pick ends and weighs 9.9 oz./sq. yard. The fabric is scoured with detergent to remove finishing agents, sizes, etc.

A 3 x 6″ piece of filament nylon fabric is immersed in the adhesive composition prepared in D above at 25–30° C. for 5 seconds. After the excess resin solution has been squeezed off, the dipped fabric is dried for 20 minutes at 135° C. and it is found that it typically gains about 6.2 percent of the adhesive (gain in weight based on the weight of the untreated fabric).

The coated nylon is then pressed against an 80-mil thick sheet of the sulfur-curable ethylene hydrocarbon elastomer of part E. A 3″ x 1½″ piece of cellophane is placed at one end of the elastomer to facilitate subsequent separation of the elastomer and the fabric for testing. The elastomer is supported by 10-oz. cotton duck to provide stability. The assembly is then cured at 160° C. for 20 minutes under a pressure of 240 p.s.i. The peel adhesion of the resulting composite article typically displays an adhesive strength of about 16 lbs./linear inch at 25° C. as determined on an Instron tester by measuring the force necessary to separate a 1″ wide piece of the fabric from the elastomer at a head speed of 2″/min.

EXAMPLE 2

(A) *Preparation of brominated ethylene/1,4-hexadiene copolymer.*—The ethylene/1,4-hexadiene copolymer employed is made in tetrachloroethylene in the presence of a diisobutyl aluminum monochloride/vanadium tris(acetylacetonate) coordination catalyst in accordance with the general directions of U.S. Patent 2,933,480. This copolymer has about 67 weight percent ethylene units and about 33 weight percent 1,4-hexadiene units. Its inherent viscosity is about 1.1 (measured at 30° C. on a solution containing 0.1 gram of the copolymer in 100 cc. of tetrachloroethylene). It displays an iodine number of about 74, and a Wallace plasticity at 100° C. of about 8.9.

*Bromination of the ethylene/1,4-hexadiene copolymer.*—Five hundred and sixty-two grams of the above ethylene copolymer are dissolved in 7,500 ccs. of dry carbon tetrachloride by agitating at reflux at atmospheric pressure in a 12-liter round-bottom flask fitted with a paddle agitator, a dropping funnel, a water-cooled condenser and a thermometer. The flask is covered with aluminum foil to exclude light and the contents cooled to 11–13° C. by the use of an ice water bath. To the vigorously agitated ethylene/1,4-hexadiene copolymer solution is added a solution of 60 ccs. of bromine in 1600 ccs. of dry carbon tetrachloride over a period of about 90 minutes. The solution is stirred for an additional ½ hour after all of the bromine has been added and is then sparged with nitrogen for 1 hour while being stirred and then for an additional 3 days without agitation. Approximately one part of N-phenyl-β-naphthylamine antioxidant is then added to the solution for each one hundred parts by weight of brominated copolymers. The material is drum dried using 40 p.s.i. steam in the rolls and a roll speed of 7.5 r.p.m.'s. The brominated copolymer has a bromine content of approximately 23.5%, an iodine number of about 20, and a Wallace plasticity at 100° C. of about 12.

(B) *Preparation of copolymer latex.*—A solution made by dissolving 10 g. of the brominated ethylene/1,4-hexadiene copolymer in 390 cc. of carbon tetrachloride is added slowly at 25° C. over a period of 13 minutes to a solution of 1.0 g. of "Duponol" ME in 100 cc. of water agitated vigorously in an Osterizer blender. An emulsion is obtained having the viscosity of shaving cream. Solvent is removed at 100 mm. Hg by heating the emulsion for 90 minutes in a water bath held at 35–45° C. The water base latex obtained typically contains 10.9% solids.

(C) *Preparation of adhesive composition.*—Twenty grams of the above latex are then mixed with 5.8 g. of a resorcinol-formaldehyde resin solution made up as described in Example 1 and aged for 6 hours. It has a pH of about 9.6 at 25° C.

(D) *α-Olefin hydrocarbon elastomer.*—The elastomer stock employed is the same as that used in Example 1 except that 20 parts of naphthenic petroleum oil ("Necton 60") are added.

(E) *Adhesion of elastomer to nylon cord.*—Nylon tire cord type 702 is passed three times through the coating composition prepared in part C above at about 3 ft./min. and dried for about 30 seconds in 135° C. air after each pass. Typically, the coating pick-up is about 4.8% by weight.

The coated nylon cord samples are then used to conduct "single-cord adhesion" tests or "H-pull tests" as described in India Rubber World, 114, 213–17 (1946). The coated cord samples are molded as described in the reference into the sulfur-curable ethylene hydrocarbon elastomer which is compounded as described above and the assemblies cured for 40 minutes at 160° C. under a pressure of about 3000–3500 p.s.i., starting with the mold at room temperature. The resulting composite articles, tested as described in the reference (head speed 2 inches/min.), typically display adhesive strengths of about 13 lbs. at 25° C. When the above cord is heat set by heating for an additional minute at 190° C. and then made up into H-pull specimens as described above, it typically requires 15 lbs. force to separate the cord from the elastomer stock.

EXAMPLE 3

The polymers used are two brominated ethylene/1,4-hexadiene copolymers made by a procedure similar to that described in Example 2 from an ethylene/hexadiene copolymer containing 33% 1,4-hexadiene monomer units and exhibiting a Wallace plasticity of 16 at 100° C. Polymer A has a bromine content of 19% and an iodine number of 36. Polymer B has a bromine content of 27% and an iodine number of 15.

Each of these bromine-substituted copolymers is converted into a latex by a procedure similar to that described in Example 2 above except that isopropanol is additionally used as an emulsification modifier. A solution containing 10 g. of Polymer A in 196 grams of carbon tetrachloride is agitated in 100 cc. of water and 30 cc. of isopropyl alcohol containing 1.0 g. of "Duponol" ME. The resulting emulsion is stripped under vacuum (approximately 100 mm. Hg) for 4 hours at a water bath temperature ranging from 35–45° C. The latex obtained typically weighs about 92.4 g., has a pH of about 3.2 (which is adjusted to 10.0) and contains about 10.4% solids.

A solution containing 10 g. of Polymer B in 181.5 g. of carbon tetrachloride is emulsified in the water-isopropanol-"Duponol" mixture described above and stripped under similar conditions to yield typically about 53.5 g. of latex with a pH of about 2.7 (which is adjusted to 10.1). The solids content is about 21.5%.

Two adhesive compositions are prepared from the above latexes. Composition A contains 11.6 g. of a resorcinol-formaldehyde resin solution made up as described in Example 1, 5.3 g. of a 41% solids butadiene/styrene/2-vinylpyridine latex ("Gen-Tac") and 20.8 g. of latex A. Composition B contains 11.6 g. of resin solution, 5.3 of "Gen-Tac" and 10.0 g. of latex B.

Nylon tire cord (type 714) is coated with the above dips and tested in the elastomer stock of Example 2. The typical results are described below:

| Polymer | Percent of Adhesive Composition on Cord | H-Pull Adhesion (lbs.) at 25° C. |
|---|---|---|
| A | 5.8 | 18 |
| B | 8.8 | 17 |

EXAMPLE 4

(A) *Preparation of chlorinated ethylene/1,4-hexadiene copolymer.*—A chlorinated ethylene/1,4-hexadiene copolymer is made as follows: 50.0 g. of an ethylene/1,4-hexadiene copolymer similar to that employed in Example 3 is dissolved in 1000 ml. of CCl₄ by agitating at reflux at atmospheric pressure in a 2-liter glass round-bottom flask.

After the contents are cooled to approximately 25° C., the flask is covered with aluminum foil and chlorine is passed through at such a rate that 7.5 g. are added over a period of 18 minutes; 250 cc. of solution are then removed and chlorination is continued until an additional 1.5 g. of chlorine are added. The total addition time is about 24 minutes.

The solution is evaporated at room temperature and dried for 1 hour at 60° C. in a vacuum oven. The residue weighs 34.5 g., contains about 15.5% chlorine and has a bromine equivalent of about 0.57 mole of bromine per kilogram.

(B) *Preparation of copolymer latex.*—10.0 g. of the chlorinated copolymer described in A is dissolved in 100 ml. of CCl₄ and emulsified in 100 cc. of water plus 30 cc. of isopropyl alcohol using 1.0 g. of "Duponol ME" as surfactant. After stripping for 1 hour at 50° C. and a pressure of 100 mm. Hg, followed by 1 hour at 50° C. and a pressure of 60 mm. Hg, about 75.1 g. of emulsion are obtained having a pH of about 2.9 which is adjusted to about 10.4 by the addition of dilute NaOH. The solids content is about 10.4%.

(C) *Preparation of adhesive composition.*—An adhesive composition is prepared by combining 23.0 g. of the latex described in part B with 5.8 g. of a resorcinol-formaldehyde resin solution prepared as described in Example 1 except that it is aged for about 25 hours before use. The adhesive composition is aged for about 2 hours before use.

(D) *α-Olefin hydrocarbon elastomer.*—The ethylene/propylene/1,4-hexadiene copolymer employed is the same as that described in Example 1. It is compounded in the recipe shown below:

| | Parts by weight |
|---|---|
| Ethylene/propylene/1,4-hexadiene copolymer | 100 |
| Carbon black, HAF | 80 |
| Naphthenic petroleum oil ("Necton 60") | 47.5 |
| ZnO | 5 |
| Stearic acid | 1 |
| Sulfur | 1 |
| 2-mercaptobenzothiazole | 0.75 |
| Tetramethyl thiuram monosulfide | 1.5 |

(E) *Adhesion of elastomer to rayon tire cord.*—A rayon tire cord (type 272) was coated with 7.3 weight percent of the above adhesive composition by passing it through the composition 5 times, drying it for approximately 30 seconds at 135° C. after each pass.

The coated cord was then cured in the elastomer stock described above and tested for H-pull adhesion at 25° C. as described in Example 2. Typically, adhesion is about 12 lbs.

When a similar rayon tire cord is coated with 6.0% of standard adhesive composition made by substituting a butadiene-styrene-2-vinylpyridine latex ("Gen-Tac") for the chlorinated copolymer on an equal solids basis, the H-pull value is typically only about 8 lbs.

EXAMPLE 5

(A) *Preparation of latex of brominated ethylene/1,4-hexadiene copolymer.*—A brominated ethylene/1,4-hexadiene copolymer containing about 25.3% bromine by weight and characterized by an iodine number of about 15 and an inherent viscosity (at 30° C.) of about 1.2 is prepared according to the general procedure of part A of Example 2. The ethylene/1,4-hexadiene copolymer employed contains 31 weight percent 1,4-hexadiene monomer units and exhibits a Wallace plasticity of about 14 (at 100° C.).

A 772 cc. solution made by dissolving 60 grams of the brominated copolymer in carbon tetrachloride is added over a period of about 10 minutes to a solution of 6 grams of "Duponol" ME in 400 cc. of water and 180 cc. of isopropyl alcohol in a 1-gallon Waring Blendor at 25° C. After the resulting emulsion has been stripped under vacuum in accordance with the procedure of Example 2, a latex is obtained having a solids content of about 20% and exhibiting a pH (at 25° C.) of about 3.4. A 7.85% aqueous sodium hydroxide solution is added to raise the pH value to about 10.1.

(B) *Preparation of the adhesive composition.*—(1) A resorcinol/formaldehyde resin B–1 is made according to the procedure of part C of Example 1. Five hours after mixing, 11.6 grams of this resin and 21.6 grams of the latex are stirred together to form Dip A and allowed to age at 25° C. After a day the pH of the dipping composition is about 9.4 at 25° C.

(2) A resorcinol/formaldehyde resin B–2 is made by a procedure identical to that employed for B–1 except that sodium hydroxide is omitted. Five hours after mixing the solution exhibits a pH of about 6 at 25° C. In turn, 10.8 grams of the resin solution and 0.86 gram of a 50% aqueous ZnO dispersion are added to 21.6 grams of the brominated ethylene/1,4-hexadiene copolymer latex to form Dip B. The resulting dipping composition displays a pH of about 7.5 after 16 hours aging at 25° C.

(C) *Adhesion of α-olefin elastomer to nylon tire cord.*—Separate lengths of nylon tire cord (T–714) is passed through the dipping compositions A and B, dried in air at 135° C. for 0.7 minute, and again dipped and dried the same way. The coated cords are then cured against the compounded ethylene/propylene/1,4-hexadiene copolymer composition of Example 2 for 40 minutes at 160° C. in accordance with the procedure therein. The composite articles typically exhibit the following adhesion values:

| Dip | Percent Pick-up | H-Pull Adhesion (lb.) at 25° C. |
|---|---|---|
| A | 8.6 | 26 |
| B | 9.0 | 21 |

EXAMPLE 6

(A) *Preparation of latex of brominated ethylene/1,4-hexadiene.*—A brominated ethylene/1,4-hexadiene copolymer containing about 5.5% bromine is prepared according to the general procedure of part A of Example 2 from an ethylene/1,4-hexadiene copolymer containing about 33% 1,4-hexadiene monomer units and exhibiting a Wallace plasticity of about 16 at 100° C.

A solution made by dissolving 10 g. in 144 cc. of $CCl_4$ is emulsified as described in Example 5 and is stripped in a similar manner except for a period of 2 hours at 100 mm. Hg instead of 1 hour. About 71.1 g. of latex are obtained with a pH of about 5.4 which is adjusted to about 10.

(B) *Preparation of the adhesive composition.*—28.4 g. of the above latex is combined with 11.6 g. of a resorcinol-formaldehyde solution prepared as described in Example 1 except that it is aged for 18 hours before use. The adhesive composition is allowed to stand for an additional 5 hours before being used.

(C) *Adhesion of α-olefin elastomer to nylon tire cord.*—A nylon tire cord (type 714) is coated with 5.4% of the adhesive composition, cured in the elastomer stock described in Example 2 for 40 minutes at 160° C. and tested for H-pull adhesion as described in Example 2. At a 25° C. test temperature the adhesion is about 19 lbs.; at a test temperature of 100° C. the adhesion is about 12 lbs.

When cord is coated with 5.8% of conventional adhesive composition (made as described in Example 4) the adhesion values are only about 10 lbs. and 8 lbs., respectively.

In the above examples, the surfactants used can be more fully described as follows: "Alrosol" is a fatty alkylol amide condensate, 87% active, made by the Geigy Chem. Corp.; "Benax 2A1" is a sodium dodecyl diphenyl ether disulfonate, 90% active made by the Dow Chem. Co.; and "Duponol ME" is the sodium salt of technical lauryl alcohol sulfate made by the Du Pont Company.

As many widely different embodiments of this invention may be made without departing from the spirit and scope thereof, it is to be understood that this invention is not limited to the specific embodiments thereof except as defined in the appended claim, and all changes which come within the meaning and range of equivalence are intended to be embraced therein.

What is claimed is:

1. A process for firmly adhering a sulfur-curable copolymer of ethylene, propylene and a non-conjugated hydrocarbon diene, containing about 20 to 75 weight percent ethylene, to a substrate selected from the group consisting of polyamide and cellulosic substrates by coating said substrate with an aqueous dispersion containing about 1 to 6 weight parts of (a) sulfur-curable, chain-saturated ethylene copolymer substituted by side-chain alkyl radicals of from 2 to 4 carbon atoms substituted by at least one halogen selected from the group consisting of bromine and chlorine, the halogen content of said copolymer being from about 10 to 40 weight percent and having an inherent viscosity of at least about 0.3 and an iodine number of about 10 to 15, per weight part of (b) a resorcinol-formaldehyde type resin containing about 0.7 to 2 moles of formaldehyde per mole of resorcinol, drying the coating, and curing the hydrocarbon copolymer while pressing it in contact with the coated substrate.

References Cited

UNITED STATES PATENTS

| | | | |
|---|---|---|---|
| 2,630,398 | 3/1953 | Brooks et al. | 117—124 |
| 2,822,311 | 2/1958 | Rowe et al. | 152—359 |
| 2,933,480 | 4/1960 | Gresham et al. | 260—80.5 |
| 2,994,690 | 8/1961 | Kuntz | 260—85.3 |
| 3,000,866 | 9/1961 | Tarney | 260—80.5 |
| 3,036,027 | 5/1962 | Ziarnik | 260—43 |
| 3,085,074 | 4/1963 | Burke et al. | 260—29.3 X |
| 3,144,426 | 8/1964 | Burke et al. | 260—29.3 X |
| 3,194,294 | 7/1965 | Gils | 260—29.3 X |
| 3,287,440 | 11/1966 | Giller | 260—848 X |
| 3,294,866 | 12/1966 | Soldatos | 260—845 |

MURRAY KATZ, *Primary Examiner.*

WILLIAM D. MARTIN, *Examiner.*

M. R. LUSIGNAN, *Assistant Examiner.*

UNITED STATES PATENT OFFICE
CERTIFICATE OF CORRECTION

Patent No. 3,366,508             January 30, 1968

George Arthur Gallagher

It is hereby certified that error appears in the above numbered patent requiring correction and that the said Letters Patent should read as corrected below.

Column 4, line 54, for "10 cc." read -- 120 cc. --; column 5, line 22, for "was" read -- as --.

Signed and sealed this 6th day of May 1969.

(SEAL)
Attest:

Edward M. Fletcher, Jr.

Attesting Officer

Commissioner of Patents